May 4, 1954 — A. E. PUCKETT — 2,677,274
SUPERSONIC WIND TUNNEL APPARATUS
Filed Aug. 7, 1946
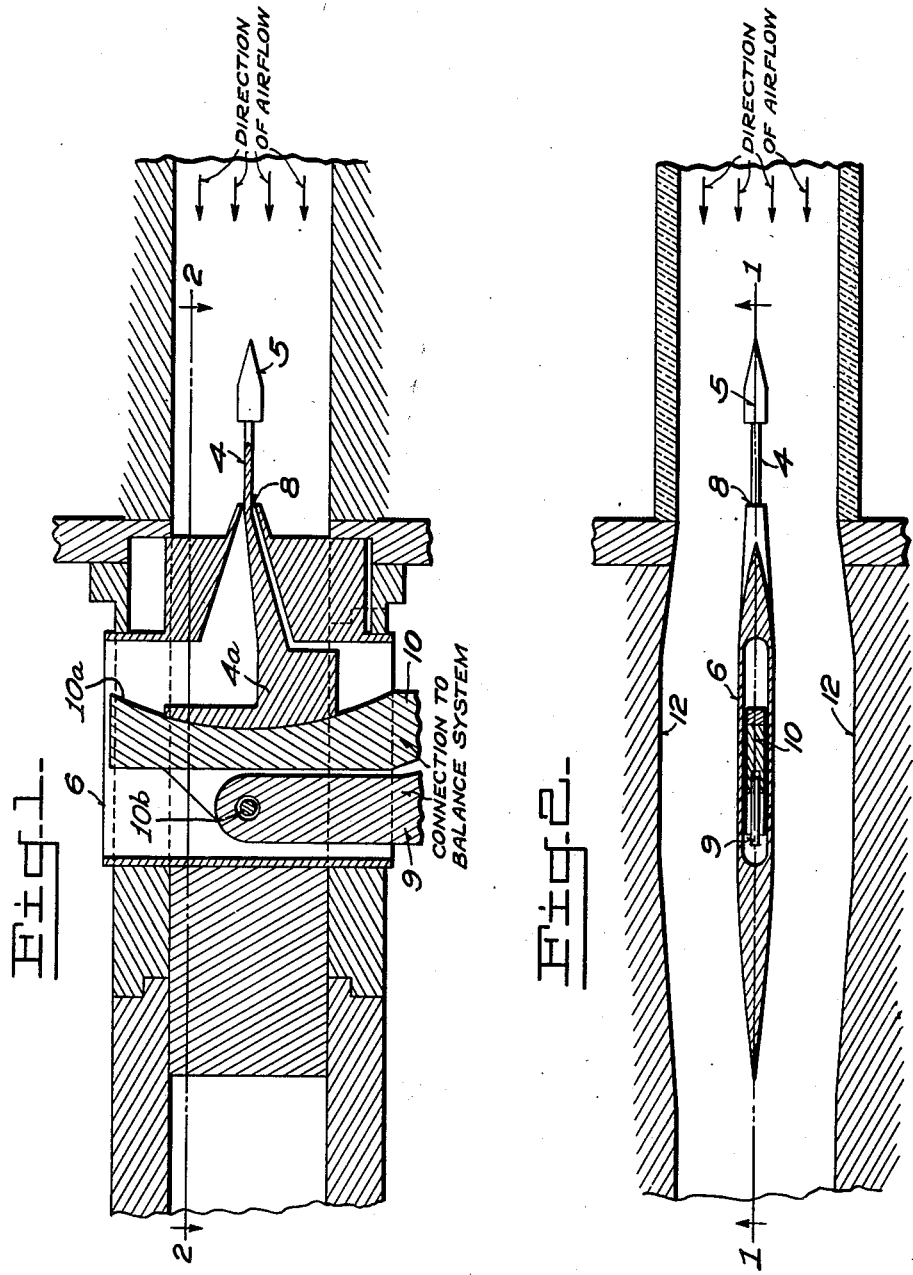
Inventor
ALLEN E. PUCKETT,
By J. H. Church + H. E. Thibodeau
Attorneys Patented May 4, 1954

2,677,274

UNITED STATES PATENT OFFICE 2,677,274

SUPERSONIC WIND TUNNEL APPARATUS

Allen E. Puckett, Pasadena, Calif., assignor to the United States of America as represented by the Secretary of War Application August 7, 1946, Serial No. 689,055

5 Claims. (Cl. 73—147)

This invention relates to supersonic wind tunnel apparatus.

Very fast-moving objects such as high velocity shells, rockets, bombs, etc., often attain velocities in excess of the speed of sound. In the design of such missiles, their behavior at supersonic speeds must be studied under controlled conditions. This is best accomplished by the use of a wind tunnel in which the air is moved at the desired velocity past a stationary test model. The construction and design of wind tunnels in which the velocity of air can be raised above the speed of sound in such air, presents problems of considerable difficulty, particularly for the larger-size tunnels. The slightest impediment to the free flow of air in the test section of such a tunnel can set up disturbances which will entirely invalidate the test results.

In order to determine the nature of the forces acting upon a model in the wind tunnel, means must be provided for transmitting an indication of these forces to the outside of the tunnel. Since the model must be mechanically supported away from the tunnel walls, one known apparatus for obtaining an indication of the forces acting on the model measures the forces transmitted by the model to its supporting member. To accomplish this the supporting member is carried outside the tunnel. To prevent wind forces from acting on this supporting member (except through the model) some sort of windshield must be provided for the supporting member. This windshield must be sufficiently far removed from the model so that it will not create interfering disturbances in the wind stream which will react on the model.

I accomplish the above object by having the supporting arm extend directly behind and downstream of the model, so that it is shielded thereby. As far rearward of the model as is mechanically feasible, the supporting arm enters a windshield through a small aperture therein which permits free motion of the arm. The arm is rigidly connected to a floating beam of a force measuring device behind the windshield; this beam is carried out through the wall of the tunnel behind the windshield so that the forces acting on the model can be measured.

In prior tunnels it has been exceedingly difficult to prevent disturbances created in the supersonic wind stream by the windshield from reacting on the model. I have discovered that I can effectively eliminate the above disturbances by supporting the model as above described and increasing the width of the wind tunnel commensurately with the thickness of the windshield. In this way the total effective free cross section of tunnel is substantially unchanged and the disturbances due to the windshield are reduced to a minimum amount.

In the drawings:

Figure 1 is a longitudinal sectional view taken on line 1—1 of Figure 2 showing the testing section and the model support section of a supersonic wind tunnel.

Figure 2 is a longitudinal sectional view taken at right angles to Figure 1 along line 2—2 of Figure 1 showing particularly the shape of the model support section.

Air at supersonic velocities is introduced into the working or test section of the tunnel by known means, such means usually comprising a system of compressors, pressure tanks and a nozzle, in which the air is accelerated to the desired velocity. This system usually varies somewhat with every installation and is not shown, as it is no part of my present invention. The supersonic air stream impinges on model 5, setting up forces thereon which are transmitted to rearwardly extending arm 4. This arm passes through aperture 8 of windshield 6 without touching the windshield at any point. The windshield 6 is faired fore and aft (as best shown in Figure 2) to produce the minimum resistance to the smooth flow of air in the tunnel and is made as thin and flat as possible in a plane axial of the tunnel for this purpose, while extending transversely across the tunnel to permit the force measuring and angle setting system shown at 9 and 10 to be carried out through the tunnel walls. Thus, support or lever 10, a portion only of which is shown, projects from a point externally of the wind tunnel test section into the transverse cavity within windshield 6. As clearly shown upon Figure 1, this support has an arcuate surface 10a facing in the direction of the test model and whose curvature is centered within the model, at the point about which it is desired to pivot the same for different angles of attack relatively to the air flow. The arm 4 is integrally connected with a base member 4a which is shaped to define an arcuate shoulder complementary to and fitting arcuate surface 10a and which also extends about support 10 and carries a pivot member 10b in the down stream direction therefrom. A lever or link 9 extends generally parallel with support 10 from the balance or force-measuring system, not shown, and has its contiguous end pivotally connected at 10b with the base member 4a.

As the arm 4 is out of contact with the fairing defining aperture 8, the entire thrust of the air stream upon the model is taken by support 10 and can be measured by appropriate force measuring means, not shown, associated therewith exteriorly of the tunnel. Furthermore, by axial translation of link 9 transversely of the tunnel, the angle of the model relatively to the air stream can be varied and, during a test, the lift thereon can be determined by measuring the axial thrust on this link. Finally, the torque or twist tending to turn link 9 and support 10 as a unit about the central axis of the model in the direction of air flow can be measured. A structure is thus provided which facilitates the measuring of the critical forces acting upon the test model, while leaving the same practically unaffected by turbulence or other disturbing forces inherently present in prior art devices. It is customary in wind tunnel work, to measure at least the drag, or forward resistance of the missile (expressed as the axial force on arm 4), the lift (or tendency to lateral displacement), and the turning moment (or the tendency to tumble in flight) of the missile. This can be done in any of a number of known ways which are not part of my present invention and so are not described in detail.

In order to minimize the effect of the windshield in disturbing the air flow, I increase the width of the model support section as shown at 12 in Figure 2, to compensate for the thickness of the windshield or housing 6. I have found that this virtually eliminates disturbances caused by the presence of the housing.

The actual dimensions around each side of the housing for the best operating conditions are different for different air speeds, and are best determined by trial and error for each condition of operation.

I claim:

1. In a wind tunnel for testing models at supersonic speeds, and including a test section, a tubular windshield extending in a first transverse direction centrally in and across said tunnel downstream from said test section, said windshield being relatively thin and flattened in a second transverse direction normal to said first direction, a support extending into said windshield in said first direction from a point exteriorly of said tunnel and having an arcuate bearing surface within said windshield concentric about a point in said test section upstream from said windshield, a base member carried by said support within said windshield and bearing on said surface for guided arcuate movement thereby about said point, and an arm fixed with said base member and extending upstream through an aperture in said windshield to said point, said arm being adapted to support a test model at said point.

2. In a wind tunnel for testing models at supersonic speeds, a test section, a faired tubular windshield extending centrally across said tunnel in one direction transversely of said tunnel and downstream from said section and flattened in a second transverse direction normal to said first direction, said tunnel having a faired enlargement past said windshield, a support extending transversely of said tunnel into said windshield from exteriorly of said tunnel and having thereon an arcuate bearing surface concentric about a point in said test section exteriorly of said windshield, a base member in said windshield and supported on said bearing surface for guided angular movement about said point as a center, an arm integral with said base member and extending in the upstream direction through an aperture in said windshield to terminate substantially at said point and adapted to support a test model at said point, and a link extending into said windshield generally parallel with said support and pivotally connected with said base member to pivot the same about said point, substantially all of that portion of said support within said tunnel being disposed within said windshield.

3. In a supersonic wind tunnel having a test section, a hollow chambered windshield extending centrally across said tunnel in a first direction transversely of said tunnel and downstream from said section, said windshield being faired to terminate at its forward and rearward termini in sharp transverse edges in said first direction and being relatively thin in a second direction transversely of said tunnel and normal to said first direction, a support extending from exteriorly of said tunnel into the chamber of said windshield generally in said first direction and having a first arcuate surface concentric about a point in said test section exteriorly of said windshield, a base member having a bearing surface guided by said first surface for angular movement about said point, an arm integral with said support and extending in the upstream direction therefrom through an opening in said windshield, said arm being adapted for carrying a test model at said point, and a link extending from exteriorly of said tunnel into the chamber of said windshield and pivotally connected with said support within said windshield at a point radially offset from said first arcuate surface, substantially all of those portions of said support and link within the tunnel being disposed within said windshield.

4. In a wind tunnel for testing models at supersonic air speeds, a test section, a hollow flat tubular windshield mounted in and across said tunnel in the downstream direction from said test section and faired to terminate in sharp forward and rearward edges transversely of said tunnel in one plane parallel with the direction of flow of air in and through said tunnel, a support extending transversely from exteriorly of said tunnel into said windshield in said plane, said support having a surface curved in said plane about a point in said test section externally of said windshield, a base member supported by said support and bearing on said surface for guided angular movement about said point as a center, an arm integral with said base member and extending generally radially to said point in the upstream direction through an aperture in said windshield, said arm being adapted to support a test model at said point, and means operable externally of said tunnel and connected with said base member to effect angular movement of said member and arm about said point, substantially all of that portion of said support within said tunnel being disposed within said windshield.

5. A wind tunnel as recited in claim 4, the cross-sectional area of said tunnel oppositely said windshield being enlarged by increase of transverse dimensions normal to said one plane.

References Cited in the file of this patent

UNITED STATES PATENTS

| Number | Name | Date |
|---|---|---|
| 1,249,484 | Pogue | Dec. 11, 1916 |
| 1,351,738 | Bowen | Sept. 7, 1920 |
| 1,404,920 | Zahm | Jan. 31, 1922 |
| 1,498,023 | Fales | June 17, 1924 |
| 2,065,496 | Adams | Dec. 29, 1936 |
| 2,101,858 | Knisley | Dec. 14, 1937 |
| 2,394,766 | Halford | Feb. 12, 1946 |
| 2,448,966 | Fales | Sept. 7, 1948 |
| 2,485,977 | Mains | Oct. 25, 1949 |
| 2,515,069 | Zola | July 11, 1950 |

FOREIGN PATENTS

| Number | Country | Date |
|---|---|---|
| 19,166 of 1904 | Great Britain | July 6, 1905 |
| 274,598 | Germany | May 26, 1914 |
| 330,230 | Germany | Dec. 9, 1920 |
| 446,837 | Germany | July 8, 1937 |
| 521,143 | Great Britain | May 14, 1940 |